March 22, 1955 R. E. BLAND 2,704,739
PROCESS AND APPARATUS FOR CATALYST VAPOR DISENGAGEMENT
Filed Nov. 29, 1950
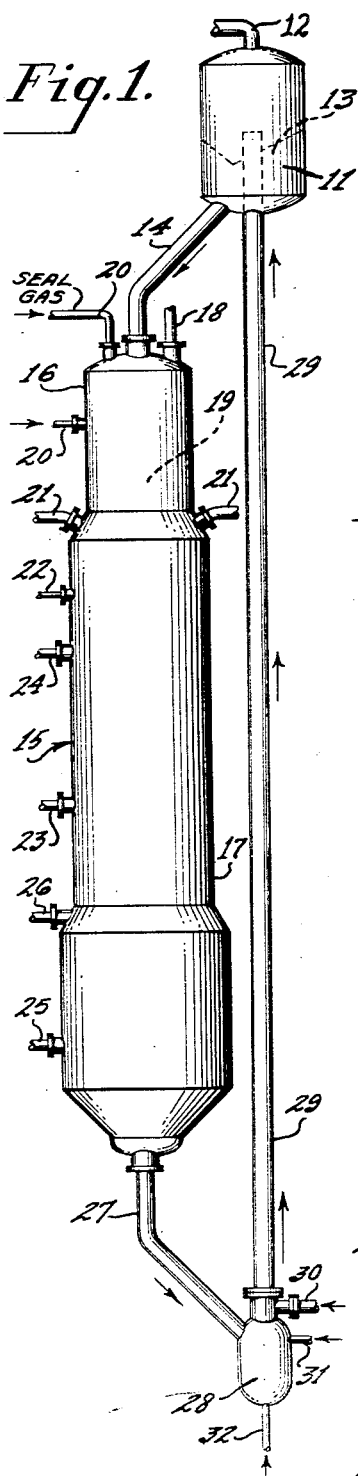
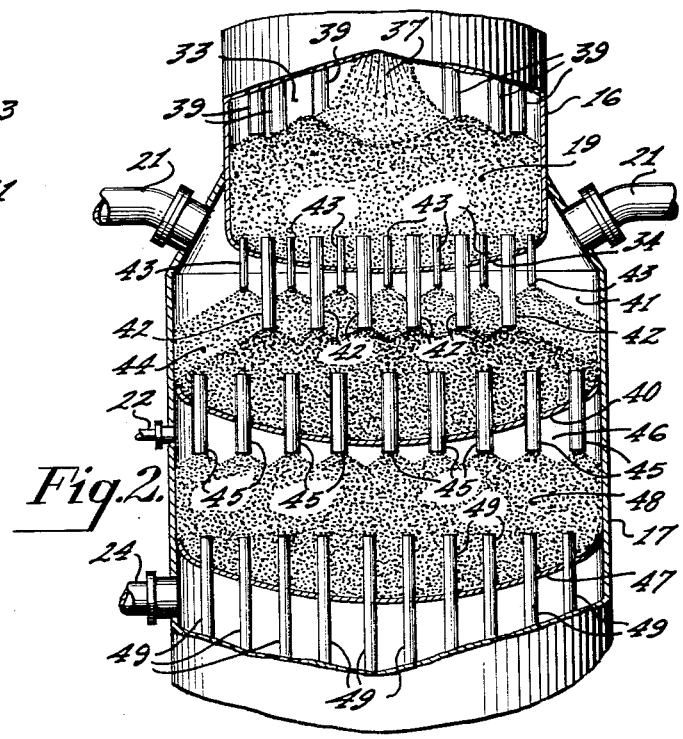
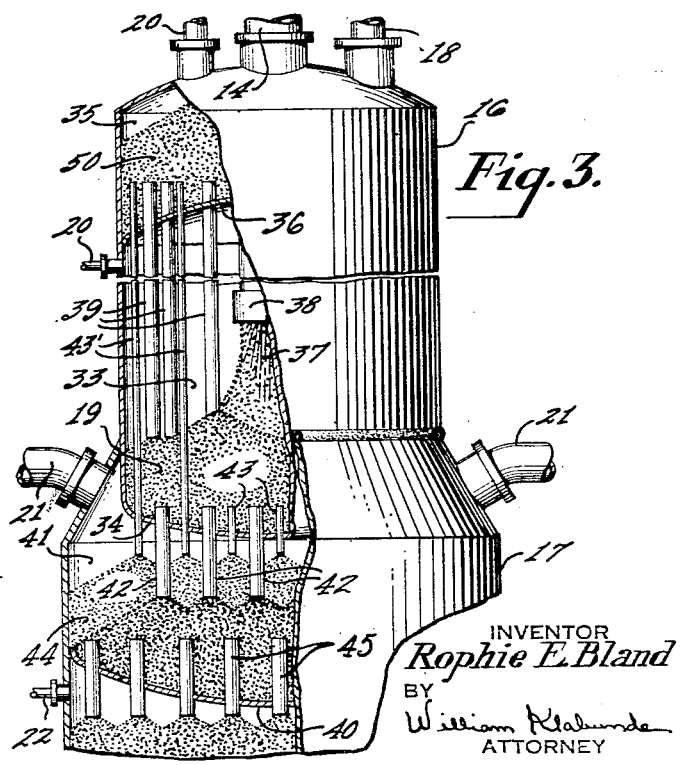
INVENTOR
Rophie E. Bland
BY William Klabunde
ATTORNEY United States Patent Office 2,704,739
Patented Mar. 22, 1955

2,704,739

PROCESS AND APPARATUS FOR CATALYST VAPOR DISENGAGEMENT

Rophie E. Bland, St. Davids, Pa., assignor to Houdry Process Corporation, Wilmington, Del., a corporation of Delaware Application November 29, 1950, Serial No. 198,125

8 Claims. (Cl. 196—52)

This invention relates to a method and apparatus for disengaging gas and granular contact material, particularly as applied to hydrocarbon conversion or other chemical processing systems.

In many such processing systems, and especially in the treatment of hydrocarbons, gaseous reactants are contacted with granular contact material, such as catalyst, in a concurrent flow relationship while the latter gravitates as a compact non-turbulent bed through a reaction zone. The mixture of contact material and gaseous products of reaction is continuously withdrawn from the lower end of the reaction zone and passed by gravity flow successively through disengaging and purging zones for the purpose of separating the vaporizable products of reaction from the contact material. The separated gaseous reaction products are passed to suitable recovery apparatus, known to the art, and the separated spent contact material is passed to a regenerating zone wherein carbonaceous material formed on the contact material during the reaction may be removed in conventional manner by combustion in the presence of an oxygen-containing gas. After suitable regeneration, the contact material is returned to the reaction zone so that it may be recirculated through the system. All the treating or contact zones through which the granular material gravitates may lie in a single downflow path, or in several downflow paths arranged side by side. Elevation of the granular material from the lower end of one or more downflow paths may be effected by pneumatic or mechanical means known to the art.

It is known that when granular material is passed downwardly as a compact moving column through one or more downcomers into a zone of considerably expanded flow area through which, in turn, the granular material gravitates as a compact non-turbulent bed, and when the flow rate of granular material through the zone is less than the flow capacity of the downcomer or downcomers, the lower end of the latter will determine the level of granular material within the zone, and the angle of repose for the particular material will determine the contour of the bed surface. Under such conditions, the granular material at the surface of the bed forms a frusto-conical pile or piles having a surface angle equal to the angle of repose.

Furthermore, when gases or vapors are passed with the granular material through the downcomers into the zone, and gas withdrawal means is provided at the upper end of the zone above the surface of the bed, the zone functions as a gas-solids disengager. The gaseous material discharging from the lower end of the downcomer reverses its direction of flow before it is carried to any substantial depth within the moving bed and rises to the surface thereof in a narrow annular zone immediately adjacent the lower periphery of the downcomer.

When the velocity of the gases leaving the surface of the bed in the annular zones of disengagement exceeds the supporting velocity of the solid particles constituting the bed, the particles may be lifted by the gas stream and carried thereby out of the disengaging zone through the gas discharge outlet. Since the gaseous material follows the path of least resistance in gaining the surface of the bed, substantially all of the gas will be disengaged in a narrow zone around the end of the downcomer, with consequent high velocity at the surface of the bed.

It has been found that when the lower end of the downcomer is submerged within the bed of granular material, there is a greater lateral diffusion of the gas before it reaches the surface of the bed. Disengagement may therefore take place over the major extent of the bed surface, and consequently the velocity of the gas leaving the surface of the bed is substantially lowered.

In accordance with the present invention it is proposed to raise the bed level of the granular material within the disengaging zone so that the lower ends of the downcomers are continually submerged within the bed. To this end, additional granular material, in minor amount relative to the total flow through the aforesaid downcomers, is introduced into the disengaging zone. In accordance with the invention such additional granular material is supplied through downcomers which have a considerably smaller flow area than the main downcomers, and which terminate at a higher level within the disengaging zone. These secondary downcomers then determine the bed level, thus enabling a substantial layer of granular material to be deposited between the discharge levels of the primary and the secondary downcomers. Such additional granular material forming the aforesaid layer may be supplied from the same source that supplies material to the primary downcomers, such as the reactor bed, in which case additional gaseous material accompanies the additional granular material and is disengaged therefrom at the surface of the bed. Alternatively, the additional granular material may be supplied from any other source, such as from a surge hopper in the downflow path above the disengaging zone, or from a source of make-up granular material. In such case, the secondary downcomers do not convey a gaseous medium into the disengaging zone, except such slight amounts of gas as may be required for sealing purposes to prevent undesirable gas migration.

Typical of the systems to which the present invention is especially adapted is that generally described in an article entitled "Houdriflow: New Design in Catalytic Cracking," appearing at page 78 of the January 13, 1949 issue of the "Oil and Gas Journal." Briefly, the abovementioned article discloses a catalytic cracking system for the refining of hydrocarbons comprising an elongated cylindrical vessel laterally subdivided into a series of confined zones through which granular contact material is continuously passed by gravity flow, gravitating progressively through: a surge chamber; a reaction chamber wherein the contact material is contacted with the hydrocarbon reactants under conditions suitable for carrying out the desired reaction; a disengaging chamber wherein the various products of reaction are separated from the contact material and separately withdrawn therefrom; a purging chamber wherein the contact material is stripped by an inert gas, such as steam, of vaporizable hydrocarbon components retained on the contact material or carried in admixture therewith out of the disengaging zone; one or more regenerating chambers wherein the contact material, bearing the carbonaceous deposit acquired in the reaction chamber, is contacted by oxygen-containing gas to remove by combustion the carbonaceous deposit on the contact material; and a final disengaging zone wherein the gaseous products of regeneration are separated from the contact material and separately withdrawn therefrom, the regenerated contact material being withdrawn from the lower end of the vessel and passed to the elevating means whereby it is elevated for recirculation through the vessel. Throughout the major portion of its path of travel downwardly through the vessel, the contact material is maintained as a continuously moving mass confined in part of the path as a broad compact moving bed, and in part as a plurality of compact moving columns.

The above-mentioned article appearing in the "Oil and Gas Journal" illustrates a pneumatic lift for elevating the granular material from a lift hopper located at the lower end of the downflow path to a lift hopper located at an elevation above the upper end thereof, from which latter hopper the contact material may be continuously passed downwardly through the various treating zones. The present invention, however, is in no way limited to the use of a pneumatic lift for recirculating the contact material and, if desired, other means may be employed for effecting the desired elevation of the material.

For a clearer understanding of the invention, reference may be made to the accompanying drawing forming a part of this application in which:

Fig. 1 illustrates a typical hydrocarbon cracking system having a pneumatic lift for circulating granular catalyst;

Fig. 2 is an enlarged fragmentary sectional view showing the disengaging zone and the immediately adjacent treating zones of Fig. 1; and Fig. 3 is an enlarged fragmentary view, in partial section, of the reactor section of Fig. 1, including a modified disengager.

Referring to Figs. 1 and 2 of the drawing, catalyst in the form of granules, pellets, etc. is supplied to the downflow path of the hydrocarbon processing system from a lift hopper 11, to which the catalyst has previously been elevated by means of a pneumatic lift. Lift hopper 11 includes a disengaging zone wherein catalyst is separated from the lift gas, the latter being removed through gas outlet line 12, and the catalyst 13 being continuously withdrawn from the lower end of the lift hopper 11 through a seal leg 14 and introduced into the upper end of an elongated processing vessel, generally indicated by the numeral 15, comprising an upper reactor section 16 and a lower regenerator section 17, the latter being of greater diameter than the reactor section.

Hydrocarbon feed is supplied to the reactor section 16 of vessel 15 through inlet line 18. In the upper region of the reaction chamber the hydrocarbon liquid feed is sprayed in known manner onto a falling curtain of catalyst, which has been introduced into the reactor section 16 through the seal leg 14. The hydrocarbon-coated catalyst falls freely into a catalyst bed 19 maintained within the reaction chamber as a downwardly moving compact non-turbulent mass of catalyst, within which the hydrocarbon reactants are converted to the desired gaseous reaction products. Process steam may be introduced into the reaction chamber, and steam for sealing purposes may be introduced into the upper end of vessel 15, through inlets 20. The catalyst, which has become spent by reason of a carbonaceous deposit formed thereon during the reaction, together with the gaseous products of reaction pass downwardly by gravity flow from the reaction zone at the lower end of section 16 into a solids-vapor disengager section located at the upper end of the enlarged regenerator section 17, wherein the gaseous reaction products are separated from the spent catalyst. The gaseous reaction products are withdrawn from the vessel 15 through vapor outlets 21. The separated spent catalyst gravitates downwardly through a purging section wherein it is contacted with a stripping gas, such as steam, introduced through inlet 22. The purge steam and the vaporizable material removed from the spent catalyst, together with the separated gaseous material, pass out of the vessel 15 through the vapor outlets 21. From the purging section, the spent catalyst gravitates in known manner through internal seal legs into the regenerating zone of regenerator section 17. Within the regenerating zone, the spent catalyst undergoes in known manner successive stages of regeneration. In the upper stage, oxygen-containing gas introduced through inlet 23 passes countercurrently to the flow of catalyst. The gaseous products formed in the upper stage of regeneration are removed from vessel 15 through flue gas outlet 24. From the first stage of regeneration the catalyst gravitates downwardly to the second stage of regeneration, with intermediate cooling between the stages by indirect heat exchange with a circulating medium, if desired. Oxygen-containing gas is supplied to the lower stage of regeneration through inlet 25, and the gaseous products of regeneration are removed from the upper end of the second regenerating stage through flue gas outlet 26.

The regenerated catalyst is withdrawn from the lower end of vessel 15 through seal leg 27 and is introduced into the upper end of lower lift hopper 28. The regenerated catalyst is then elevated through a substantially vertical lift pipe 29 to the upper lift hopper 11 by means of lift gas which may be introduced into the lower lift hopper through one or more inlet lines, such as 30, 31 and 32. Within the lower lift hopper 28 an introduction zone is provided wherein the catalyst is engaged by the lift gas and conveyed upwardly thereby through the lift pipe.

Referring to Figs. 2 and 3 of the drawing, the reaction chamber 33 of the reactor section 16 of vessel 15 is defined at its lower end by a dished tube-sheet 34 which supports the catalyst bed 19. The catalyst is continuously supplied to the reactor bed 19 from a surge chamber 35 located at the upper end of the reactor section. Surge chamber 35 and reaction chamber 33 are separated by a tube-sheet 36. The major portion of the catalyst is passed from surge chamber 35 centrally into the reaction chamber 33 as a freely falling mass 37, upon which the liquid hydrocarbons introduced through inlet 18 are sprayed from a liquid feed nozzle 38 located in the upper end of the reaction chamber 33. Referring to Fig. 2, a constant level of catalyst in bed 19 of reaction chamber 33 is maintained by an annular row of downcomers 39 in the outer region thereof which convey catalyst along confined paths from the surge chamber 35 to the lower region of the reaction chamber 33. When the level of catalyst bed 19 reaches the lower ends of downcomers 39, further flow through the latter is interrupted, thus cutting off that portion of the total catalyst flow contributed by the series of downcomer tubes 39.

At the upper end of regenerator section 17, and spaced a relatively short distance below the tube-sheet 34 which supports the reactor bed 19, a dished tube-sheet 40 extends horizontally across the vessel 15. The space between tube-sheets 34 and 40 provides a catalyst-vapor disengaging chamber 41 wherein the mixture of catalyst and hydrocarbon vapors withdrawn from the lower end of the reactor bed 19 are separated. In passing from the reaction chamber 33 into the disengaging chamber 41, the catalyst-vapor mixture is conveyed through two sets of downcomers 42 and 43 set in the tube-sheet 34. Downcomers 42 are of greater flow area than downcomers 43, so as to convey the major portion of the catalyst-vapor mixture from the reaction zone into the disengaging chamber 41, and they extend to a lower level within chamber 41 than the downcomers 43. The catalyst discharging from downcomers 42 and 43 forms within the disengaging chamber a compact non-turbulent bed 44 supported by the tube-sheet 40, the upper level of which is controlled by the catalyst flow through the group of smaller tubes 43. The upper ends of downcomer 42 and 43 may lie in the same plane or in different planes above the tube-sheet 34, dependent upon the relative pressure drops through the downcomers. The difference in elevation between the discharge levels of downcomers 42 and 43 determines the thickness of the layer of catalyst that will be formed within the disengaging chamber 41 above the plane of discharge of the downcomers 42. A series of downcomers 45 are set in tube-sheet 40 to convey disengaged catalyst from the bed 44 into a purging chamber 46 located immediately below the disengaging chamber 41. A dished tube-sheet 47 extending laterally across the vessel 15 below tube-sheet 40 defines the lower boundary of the purging chamber. Within the purging chamber 46 and the downcomers 45, the catalyst is stripped of vaporizable hydrocarbon constituents adhering to the catalyst and hydrocarbon vapors which have been carried by entrainment out of the disengaging chamber 41 through downcomers 45. The catalyst is maintained within purging chamber 46 as a compact non-turbulent moving bed 48, supported by the tube-sheet 47 and having its level determined by the elevation of the discharge ends of downcomers 45. The purging gas inlet line 22 is located at the upper end of purging chamber 46, communicating with the free space above the catalyst bed 48. The purging or stripping gas admitted to the purging chamber 46 through inlet 22 enters the moving bed 48, primarily in the regions surrounding the lower peripheries of downcomers 45. Upon entering the bed 48, the purging gas reverses its direction of flow and passes upwardly through the downcomers 45 into the catalyst bed 44 within the disengaging chamber 41. The purge gas displaces the hydrocarbon vapors successively from the bed 48, the columns of catalyst descending through downcomers 45, and the catalyst bed 44, forcing the stripped vapors into the free space at the upper end of disengaging chamber 41, from which space the mixture of stripped hydrocarbon vapors, purging steam, and disengaged hydrocarbon vapors are removed through the outlet lines 21. The gaseous effluent withdrawn through outlets 21 is passed to conventional treating apparatus of the hydrocarbon conversion system, which is not illustrated or described herein since it forms no part of the present invention. From the bottom of catalyst bed 48 within chamber 46, purged catalyst is continuously withdrawn through elongated downcomers or seal legs 49 set at their upper ends in the tube-sheet 47 and depending into the kiln or regenerator section of vessel 15. When the reaction zone is maintained at a higher pressure than the regeneration zone, downcomers 49 are of sufficient length to provide the necessary seal leg between reactor section 16 and regenerator section 17, so that gases from the latter may not pass upwardly through downcomers 49 into the reactor section.

Since the present invention is directed particularly to improvements in the catalyst-vapor disengager section, a detailed description of the construction and operation of the regenerator section 17 is not deemed necessary for a complete understanding of the invention, and is therefore omitted.

Referring to Fig. 2, downcomers 42 and 43 have the elevations of their discharge planes sufficiently spaced to provide a layer of catalyst of substantial depth above the discharge ends of the larger downcomer 42. As stated, the larger tubes 42 are of such size and in such number as to convey a substantially greater portion of the catalyst-vapor mixture than the smaller tubes 43. The main function of the latter is to determine the level of catalyst bed 44, such level being constant, so as to maintain the lower ends of tubes 42 submerged at all times within the bed 44. The smaller tubes 43 are distributed over the tube-sheet between the larger tubes 42 in any pattern that will provide a substantially uniform distribution of catalyst throughout the area of the bed 44. Since the bed level is at the lower ends of tubes 43, and the lower ends of tubes 42 are submerged within the bed, there is obviously a difference in pressure drop between the two sets of downcomer tubes. In order to avoid a preferential flow of vapors from reactor bed 19 through the smaller tubes 43, it is necessary only to so proportion the tubes 42 and 43 as to provide the pressure drop conditions which will assure a minimum of vapor flow through the smaller tubes. Although vapor disengagement will naturally occur in the surface areas about the lower ends of the tubes 43, these tubes are so designed that the quantity of gas disengaged will not be sufficient to lift the catalyst.

It is to be understood that downcomers 42 and 43 need not be constructed as shown in Fig. 2, that is, as straight vertical tubes, but may be arranged so that their discharge ends are distributed over a greater horizontal area than their inlet ends. Furthermore, it is not necessary for the inlet ends of all downcomers 42 and 43 to be in a common plane. It may be advantageous in certain cases to extend the upper ends of downcomers 43 above the level of the upper ends of downcomers 42.

Fig. 3 of the drawing shows a modification of the invention in which vapor discharge from some or all of the smaller bed level control tubes may be eliminated. The layer of catalyst between the discharge levels of the two sets of downcomer tubes may be supplied in whole or in part directly from the catalyst bed 50 within the surge chamber 35 or from any other elevated supply source, such as the catalyst make-up hopper. For some or all of the downcomer tubes 43 there may be substituted elongated downcomer tubes 43'. Tubes 43' extend upwardly through the reaction chamber 33 and into the lower region of surge chamber 35, the upper ends of the tubes being set in the tube-sheet 36. Suitable provision for differential expansion and contraction of the tubes 43' and the shell of the reactor section 16 may be made in known manner. In the specific embodiment illustrated in Fig. 3, elongated tubes 43' are provided only in the area adjacent the side walls of the vessel, the central area of the reaction zone being provided with the shorter downcomers 43.

It is contemplated that the catalyst forming the upper layer of bed 44 may be supplied from any point in the catalyst downflow path above the disengaging chamber 41 and it is further contemplated that such catalyst as may be withdrawn from points above the reaction chamber 33, such as from the surge chamber 35, may be conveyed to the disengaging chamber 41 through conduits which by-pass the reaction chamber 33.

Obviously many modifications and variations of the invention as hereinbefore set forth may be made without departing from the spirit and scope thereof, and therefore only such limitations should be imposed as are indicated in the appended claims.

I claim as my invention:

1. In a hydrocarbon conversion system comprising a reaction chamber adapted for concurrent downward flow therethrough of granular contact material and gaseous hydrocarbons, a disengaging chamber beneath and separated from said reaction chamber for disengaging the gaseous reaction products from said granular material, a tube-sheet defining the lowermost boundary of said reaction chamber, a first plurality of downcomers set in said tube-sheet and having their lower ends extending downwardly to a common discharge level within said disengaging chamber, a second plurality of downcomers, substantially smaller than said first plurality, set in said tube-sheet and having their lower ends extending downwardly to a common discharge level within said disengaging chamber substantially higher than the first-mentioned discharge level, each of said pluralities of downcomers being adapted to convey both granular material and gaseous reaction products from said reaction chamber into said disengaging chamber, means for discharging granular material free of said gaseous reaction products at the bottom of said disengaging chamber, and means for discharging disengaged gaseous reaction products from the upper region of said disengaging chamber above the level of granular material therein.

2. Apparatus as defined in claim 1 in which said first and said second pluralities of downcomers are each distributed uniformly over the area of said tube-sheet.

3. Apparatus as defined in claim 1 including a surge chamber above said reaction chamber, means for passing granular material from said surge chamber into said reaction chamber, and a third plurality of downcomers set in said tube-sheet with their upper ends extending upwardly into said surge chamber and their lower ends extending downwardly into said disengaging chamber and terminating at said second discharge level, the granular material within said third plurality of downcomers being conveyed out of contact with the granular contact material and gaseous hydrocarbons flowing downwardly through said reaction chamber.

4. Apparatus as defined in claim 3 in which the downcomers of said third plurality are located only in the peripheral area of said tube-sheet.

5. In a hydrocarbon conversion process wherein granular contact material gravitates as a compact moving mass successively through a reaction zone wherein gaseous hydrocarbons are made to flow concurrently with said granular material and through a separate disengaging zone wherein the gaseous reaction products are separated from said granular material, said granular material and gaseous reaction products being conveyed together between said separate zones as a plurality of parallel confined streams discharging at a common intermediate level within said disengaging zone, the improvement which comprises the steps of: flowing additional confined streams of said granular material from the bottom region of said reaction zone to a second common level of discharge substantially above said common intermediate level, the relative sizes of said first-mentioned streams and said additional streams being such as to cause the substantial major portion of said gaseous reaction products to be conveyed in said first-mentioned streams and only a minor incidental amount of gaseous reaction products to be conveyed in said additional streams; discharging said granular material at the bottom of said disengaging zone; and discharging disengaged gaseous material from said disengaging zone at a location above said second common level of discharge; the quantity of gaseous material conveyed in said additional streams of granular material being in such minor amount that the total quantity of gas disengaged from the granular material in the regions immediately surrounding the lower ends of said additional streams is insufficient to cause any substantial entrainment of granular material in the gaseous material discharging from said disengaging zone.

6. The method as defined in claim 5 characterized in that the depth of granular material between said discharge levels within said disengaging zone is such that the pressure drop incident to the flow of gaseous material upwardly through said depth of granular material is sufficient to effect a substantially complete lateral distribution of said gaseous material.

7. The method as defined in claim 6 including the step of introducing additional confined streams of granular material at said second level from a source outside said reaction zone.

8. The method as defined in claim 7 in which said additional streams of granular material are supplied from a surge zone located above said reaction zone and are conveyed downwardly through the peripheral region of said reaction zone into said disengaging zone.

References Cited in the file of this patent

UNITED STATES PATENTS

| | | |
|---|---|---|
| 2,416,214 | Payne | Feb. 18, 1947 |
| 2,418,679 | Utterback | Apr. 8, 1947 |
| 2,439,348 | Simpson et al. | Apr. 6, 1948 |
| 2,477,281 | Bergstrom | July 26, 1949 |
| 2,487,961 | Angell | Nov. 15, 1949 |
| 2,511,463 | Claassen | June 13, 1950 |
| 2,558,769 | McKinney | July 3, 1951 |